(12) United States Patent
Troyer et al.

(10) Patent No.: US 10,437,939 B2
(45) Date of Patent: Oct. 8, 2019

(54) PROBABILISTIC EVALUATION OF FASTENER DEGRADATION IN NUCLEAR POWER PLANTS

(71) Applicant: Framatome Inc., Lynchburg, VA (US)

(72) Inventors: Greg Troyer, Lynchburg, VA (US); Brian Haibach, Lynchburg, VA (US); Tim Wiger, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 319 days.

(21) Appl. No.: 15/158,851

(22) Filed: May 19, 2016

(65) Prior Publication Data
US 2017/0337298 A1 Nov. 23, 2017

(51) Int. Cl.
*G06N 7/00* (2006.01)
*G06F 17/50* (2006.01)

(52) U.S. Cl.
CPC ...... *G06F 17/5004* (2013.01); *G06F 17/5009* (2013.01); *G06N 7/005* (2013.01); *G06F 2217/10* (2013.01); *G06F 2217/76* (2013.01)

(58) Field of Classification Search
CPC .. G06F 14/5004; G06F 14/5009; G06F 17/18; G06N 7/02
See application file for complete search history.

(56) References Cited

U.S. PATENT DOCUMENTS

| 4,711,760 | A | 12/1987 | Blaushild | |
|---|---|---|---|---|
| 2004/0194019 | A1* | 9/2004 | Mast | G06F 17/246 715/209 |
| 2012/0191439 | A1* | 7/2012 | Meagher | G06Q 50/00 703/18 |

FOREIGN PATENT DOCUMENTS

| JP | 2002357690 A | 12/2002 |
|---|---|---|
| KR | 101547765 B1 | 8/2015 |
| WO | WO2013191521 A1 | 12/2013 |

OTHER PUBLICATIONS

Neil Sheehan: An Outage Twist: Degraded Bolts at New York Nuclear Plant Warrant Attention, p. 1, https://public-blog.nrc-gateway.gov/2016/04/27/an-outage-twist-degraded-bolts-at-new-york-nuclear-plant-warrant-attention/.

(Continued)

*Primary Examiner* — Matthew G Marini
(74) *Attorney, Agent, or Firm* — Davidson, Davidson & Kappel, LLC

(57) ABSTRACT

A probabilistic method for determining an operability interval for fasteners in a nuclear power plant assembly is provided. The probabilistic method includes determining or assuming a geometric distribution of a given initial condition of fasteners in the nuclear power plant assembly at an initial time T0; determining a future fastener failure probability model of the geometric distribution over time; generating a plurality of random future fastener failure patterns by applying the fastener failure model to the geometric distribution at a given time T1>T0; postulating fastener spacing rules designed to evaluate the acceptability of fastener failure patterns for the fasteners in the nuclear power plant assembly; applying the fastener spacing rules to a plurality of randomly generated fastener failure patterns for the given time T1 to determine the probability of the randomly generated fastener failure patterns passing the fastener spacing rules at the given time T1; iterating, by a processor of a computer, the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly; and determining the operability interval as being Tmax-T0.

20 Claims, 7 Drawing Sheets

(56) References Cited

OTHER PUBLICATIONS

Neil Sheehan: Failed Bolts Bedevil a Nuclear Plant, p. 1, https://public-blog.nrc-gateway.gov/2014/06/26/failed-bolts-bedevil-a-nuclear-plant/.
Friant et al., "Innovative Solution to Baffle Bolt Examination and Structural Integrity," 2011.
Friant et al., "NDE and Engineering Deliver a Timely and Efficient Solution for Long-Term RV Internal Structural Integrity." 2011.
www.StructintCOmetal. : "A Probabilistic Approach to Baffle Bolt IASCC Predictions", May 14, 1012, pp. 1-11, Retrieved form the Internet: URL:http://www.iaea.org/inis/collection/NCLCollectionStore/_Public/43/130/43130397.pdf?r=1.
Hure J et al: "Intergranular Stress Distributions in Polycrystalline Aggregates of Irradiated Stainless Steel", Journal of Nuclear Materials, Elsevier BV,NL, vol. 476, Apr. 26, 2016, pp. 231-242.
Al Mazouzi A et al: "Perform 60: Prediction of the Effects of Radiation for Reactor Pressure Vessel and In-Core Materials Using Multi-Scale Modelling 60 Years Forseen Plant Lifetime", Nuclear Engineering and Design, Amsterdam, NL, vol. 241, No. 9, Jan. 25, 2011, pp. 3403-3415.
Corresponding Search Report for PCT/US2017/032867.

* cited by examiner

PROBABILISTIC EVALUATION OF FASTENER DEGRADATION IN NUCLEAR POWER PLANTS

The present disclosure relates generally to nuclear power plants and more specifically to a method of assessing the degradation of fasteners.

BACKGROUND

Fasteners, such as bolts, rivets, split pins and welds, are used in various components in a nuclear power plant. In particular, core barrel bolts are used to fix baffles in place in nuclear reactor pressure vessels. FIG. 1a shows a perspective cross-sectional view of components of an exemplary pressurized water reactor (PWR) 10 that are fixed together by bolts. PWR 10 includes reactor vessel (RV) internals including a core barrel assembly 11. Core barrel assembly 11 includes a cylindrical core barrel 12 and a plurality of baffle plates 14 fixed to an inner circumferential surface 12a of core barrel 12 by a plurality of former plates 16. Baffle plates 14 are situated on top of a lower core plate 18, which is positioned above a lower support plate 20.

FIG. 1b shows an enlarged cross-sectional view of a portion of core barrel assembly 11 in which core barrel 12, baffle plates 14 and former plates 16 are connected together by a plurality of fastened connections using bolts 22, 24, 26. On a left half of FIG. 1b, baffles plates 14 are omitted to more clearly show former plates 16. Baffle plates 14 extend vertically, parallel to a center axis of core barrel 12, while former plates 16 extend horizontally, perpendicular to the center axis of core barrel 12. Baffle plates 14 are fixed together to define a plurality of right angles such that core facing vertically extending surfaces 15a of baffle plates 14 define a fluid flow path in the reactor core, with each baffle plate 14 being arranged perpendicularly to the two adjacent baffle plates 14. Baffle plates 14 may be fixed together by baffle-to-baffle (B-B) bolts 22.

Former plates 16 each include at least two inner edges 17a each for contacting a barrel facing vertically extending surface 15b of one of baffle plates 14. Inner edges 17a are each arranged perpendicular to the two adjacent inner edges 17a. Former plates 16 also each include a rounded outer edge 17b that is shaped to rest flush against inner circumferential surface 12a of core barrel 12. Former plates 16, at outer edges 17b, are fixed to inner circumferential surface 12a of core barrel 12 by core barrel-to-former (CB-F) bolts 24 that pass radially through core barrel 12 and into former plates 16 at outer edges 17b. Baffle plates 14, at barrel facing surfaces 15b, are fixed to inner edges 17a of former plates 16 by baffle-to-former (B-F) bolts 26 that pass radially through vertically extending surfaces 15a, 15b and into former plates 16 at inner edges 17a. These bolted connections are susceptible to degradation mechanisms that result in bolt failure, which is a loss of fastening capacity. Accordingly, the integrity of a structure with these bolted connections needs to be evaluated to account for future bolt failures. A redundant set of fasteners that may need to be assessed for degradation are also used in various other assemblies in nuclear power plants.

The Electric Power Research Institute (EPRI) Materials Reliability Program (MRP) developed inspection and evaluation (I&E) guidelines in MRP-227-A for managing long-term aging of PWR reactor vessel (RV) internal components. The I&E guidelines concentrate on eight aging degradation mechanisms and their aging effects. The I&E guidelines define requirements for inspections that will allow owners of PWRs to demonstrate that the effects of aging degradation are adequately managed for the period of extended operation.

MRP-227-A includes a safety evaluation report (SER) prepared by the U. S. Nuclear Regulatory Commission (NRC). The NRC staff determined whether the guidance contained in the report provided reasonable assurance that the I&E guidelines ensured that the RV internals components will maintain their intended functions during the period of extended operation. From the determination, seven topical report conditions and eight plant-specific applicant/licensee action items (A/LAIs) were contained in the SER to alleviate issues and concerns of the NRC staff. The plant-specific A/LAIs address topics related to the implementation of MRP-227 that could not be effectively addressed on a generic basis in MRP-227.

The sixth A/LAI addresses NRC staff concerns regarding inaccessible components for Babcock & Wilcox (B&W)-designed components. A/LAI 6 lists B&W external baffle-to-baffle bolts, B&W core barrel-to-former bolts, and B&W core barrel assembly internal baffle-to-baffle bolts as inaccessible components that do not need to be inspected under MRP-227 and B&W core barrel assembly internal baffle-to-baffle bolts as accessible components that are non-inspectable using currently available examination techniques. A/LAI then states that, to justify the acceptability of these components for continued operation through the period of extended operation of these components, these components should be evaluated or scheduled for replacement.

One current industry solution involves performing a detailed analysis of the structural integrity with a postulated future bolt failure pattern. If failures are identified by ultrasonic inspection at a given unit, an acceptable operating interval (i.e., re-examination interval) for that unit is defined in WCAP-17096 Rev 2, based on the number of required bolts, which is determined per a detailed analysis, and the number of bolt failures and/or replacements. Such a re-examination interval is based on a deterministic (i.e., a single future failure pattern) evaluation of structural integrity, such as that defined in WCAP-15030-NP-A.

SUMMARY OF THE INVENTION

The re-examination interval of the deterministic method is based on the number of fastener failures, without consideration of failure location. Moreover, the re-examination interval of the deterministic method permits consumption of all available margin (Margin=a number of functional fasteners minus the number of required functional fasteners) in the operating interval. Due to computational and time constraints, it is not practical to evaluate many postulated future fastener failure patterns with a detailed analysis, such as that described in WCAP-15030-NP-A, to establish a statistical treatment of margin or an assurance that margin is maintained locally throughout the structure.

An object of the present invention is to provide a probabilistic method that provides a more efficient assessment of fastener degradation in a nuclear power plant.

A probabilistic method for determining an operability interval for fasteners in a nuclear power plant assembly is provided. The probabilistic method includes determining or assuming a geometric distribution of a given initial condition of fasteners in the nuclear power plant assembly at an initial time T0; determining a future fastener failure probability model of the geometric distribution over time; generating a plurality of random future fastener failure patterns by applying the fastener failure model to the geometric distribution at a given time T1>T0; postulating fastener spacing rules designed to evaluate the acceptability of fastener failure patterns for the fasteners in the nuclear power plant assembly; applying the fastener spacing rules to the plurality of randomly generated fastener failure patterns for the given time Ti to determine the probability of the randomly generated fastener failure patterns passing the fastener spacing rules at the given time T1; iterating, by a processor of a computer, the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly; and determining the operability interval as being Tmax-T0.

A computer program product, disposed on a non-transitory computer readable media, for probabilistically determining an operability interval for fasteners in a nuclear power plant assembly is also provided. The product includes computer executable process steps operable to control a computer to receive inputs of a geometric distribution of a given initial condition of fasteners in the nuclear power plant assembly at an initial time T0; receive inputs of a future fastener failure probability model of the geometric distribution over time; generate a plurality of random future fastener failure patterns by applying the fastener failure model to the geometric distribution at a given time T1>T0; receive inputs of postulated fastener spacing rules designed to evaluate the acceptability of fastener failure patterns for the fasteners in the nuclear power plant assembly; apply the fastener spacing rules to the plurality of randomly generated fastener failure patterns for the given time T1 to determine the probability of the randomly generated fastener failure patterns passing the fastener spacing rules at the given time T1; iterate the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly; and determine the operability interval as being Tmax-T0.

A computer configured for probabilistically determining an operability interval for fasteners in a nuclear power plant assembly is also provided. The computer includes a data structure including an initial geometric distribution data describing a geometric distribution of a given initial condition of fasteners in the nuclear power plant assembly at an initial time T0, a future fastener failure probability model data describing a future fastener failure probability model of the geometric distribution over time, and fastener spacing rules data including fastener spacing rules designed to evaluate the acceptability of fastener failure patterns for the fasteners in the nuclear power plant assembly; and a processor configured to control the computer to generate a plurality of random future fastener failure patterns by applying the fastener failure model to the geometric distribution at a given time T1>T0; apply the fastener spacing rules to the plurality of randomly generated fastener failure patterns for the given time T1 to determine the probability of the randomly generated fastener failure patterns passing the fastener spacing rules at the given time T1; iterate the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly; and determine the operability interval as being Tmax-T0.

BRIEF DESCRIPTION OF THE DRAWINGS

The present invention is shown with respect to the drawings in which.

DETAILED DESCRIPTION

The present disclosure provides probabilistic structural analysis in a rapid, conservative surrogate method to the detailed analysis of the conventional deterministic method, such as that described in WCAP-15030-NP-A. The method is a set of simple fastener spacing rules to filter postulated future fastener failure patterns in acceptable and unacceptable patterns. These spacing rules sets vary based on geometry, loads, and functionality requirements.

The fastener spacing rules are validated to be a conservative surrogate to detailed analysis, by evaluating, using the detailed analysis of the deterministic method, a sufficient quantity of patterns deemed, per the fastener spacing rules, to be acceptable, such that it may be stated with high statistical confidence that the fastener spacing rules are conservative relative to detailed analysis of the deterministic method. The fastener spacing rules ensure structural integrity is maintained in all local regions of the structure and permit statistical quantification of a margin.

The probabilistic structural analysis answers questions that the existing state of the art deterministic method cannot, such determining a re-examination interval to ensure a given probability of maintaining integrity of the fastened connection at the end of the interval; determining a limited inspection sampling routine to ensure a given probability of maintaining integrity of the fastened connection at the end of the interval; quantifying the benefit (in terms of a re-examination interval, or margin to maintaining an acceptable pattern for the remainder of plant life) of a given replacement fastener pattern; and iteratively determining the replacement fastener pattern with maximum benefit.

Figure 2:
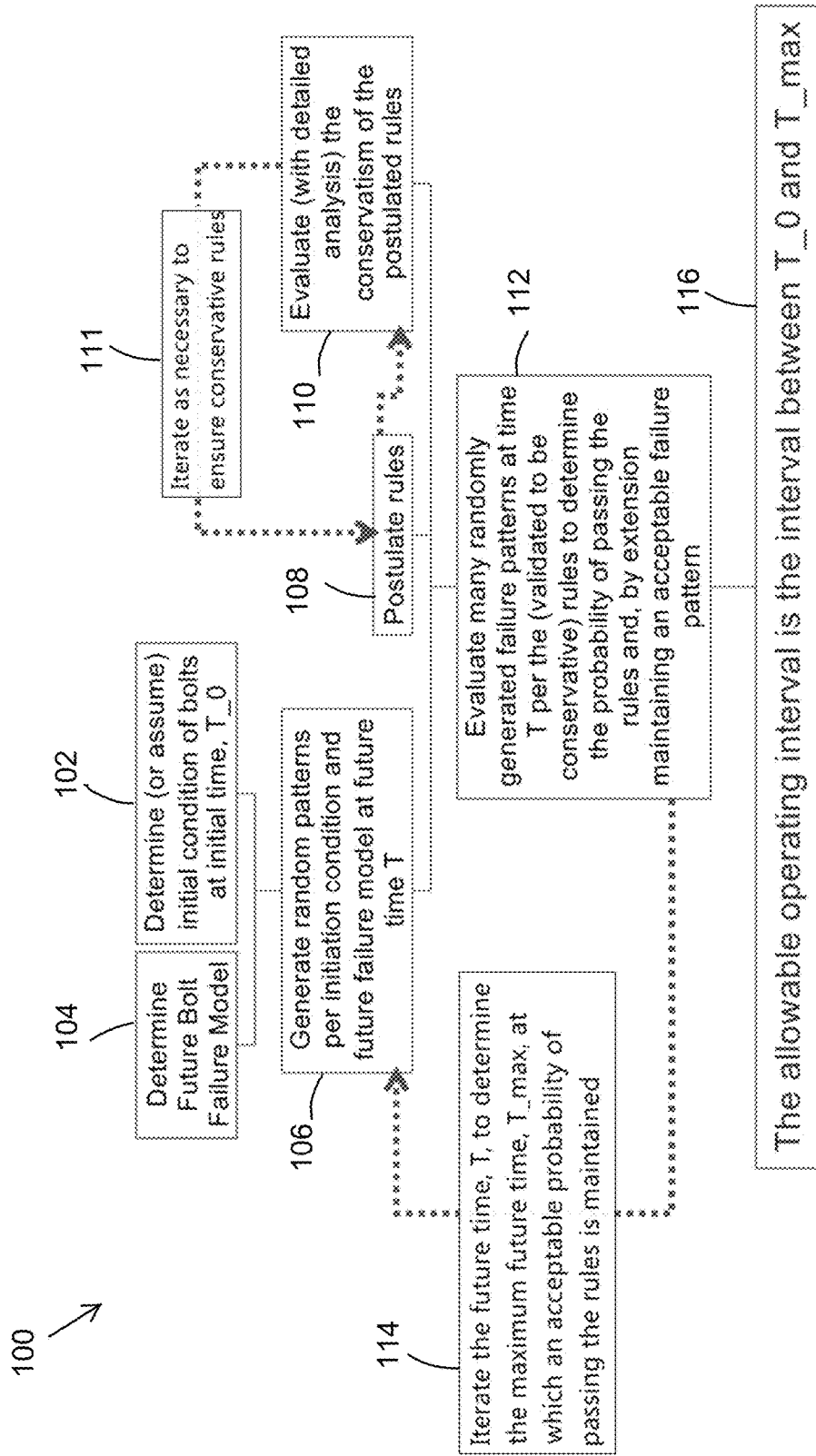
FIG. 2 shows a flow chart illustrating the general steps of a probabilistic method according to an embodiment of the present invention.
Figure 3:
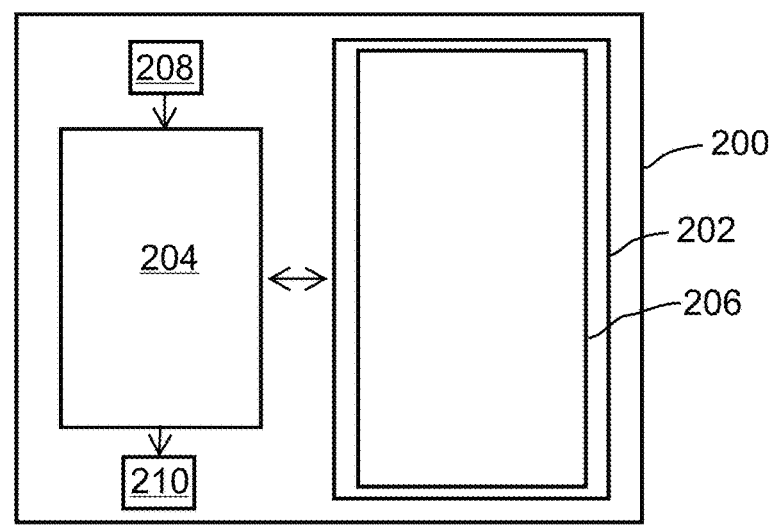
FIG. 3 shows a computer configured for implementing the method of FIG. 2.

FIG. 2 shows a flow chart illustrating the general steps of a probabilistic method 100 for probabilistically determining an operability interval for fasteners in a nuclear power plant assembly according to an embodiment of the present invention. FIG. 3 schematically shows a computer 200 configured for implementing method 100 of FIG. 2. Computer 200 includes a memory 202, which stores a data structure 206 including a plurality of data records.

Computer 200 further includes a processor 204 configured to access the data in data records of data structure 206 and perform the steps of in accordance with the method 100 as described below in response to inputs from a user via an input device 208 of computer 200 to determine the operability interval for the fasteners in the nuclear power plant assembly and display the operability to a user on an output device 210, e.g., a display, of the computer 200. Input devices 208 may each be at least one of a keyboard, a mouse or a touchscreen. In some embodiments of the present invention a computer program product may be provided to memory 202 that includes data structure 206 such that the computer program product can instruct processor 204 to carry out the method 100 described below.

A purpose of method 100 is to evaluate the probability of maintaining an acceptable fastener pattern in the future, based on a known or postulated initial fastener pattern and a future fastener failure probability model. The future fastener failure probability model includes a relative probability of fastener failures in different locations in the analyzed structure, which in this embodiment is the core barrel assembly. The future fastener failure probability model provides a probability distribution of future fastener failures as a function of time for all applicable degradation mechanisms.

In this embodiment, method 100 considers the aging degradation mechanisms applicable to B-F and CB-F fasteners, as reported in MRP-231 Revision 2 and Revision 3, which includes Irradiation-Assisted Stress Corrosion Cracking (IASCC), Irradiation-Enhanced Stress Relaxation/Irradiation Creep (ISR/IC) leading to Wear and Fatigue, and Irradiation Embrittlement (IE).

A first step 102 of method 100 includes determining or assuming a geometric distribution of a given initial condition of fasteners in the nuclear power plant assembly at an initial time T0. The geometric distribution of the given initial condition of the fasteners may be determined by inspection in the form of ultrasonic testing (UT) the fasteners if the fasteners are inspectable during a shutdown operation, to determine locations in the nuclear power plant assembly where fasteners have failed. If the fasteners are not inspectable, or it is not desirable to inspect the fasteners for example due to time constraints, the geometric distribution of the initial condition of the fasteners may be assumed based on past inspection results at other plants. For example, in this embodiment, certain locations of CB-F bolts and/or B-F bolts may be determined to be failed or functional based on inspection results or may be assumed to be failed or functional based on past inspection results at other plants.

The geometric distribution of the fasteners may include as found conditions of known or assumed functional fasteners or a combination of known or assumed functional fasteners with replacement fasteners to be installed at T0. As used herein, as found refers to condition in which accessible fasteners are examined to be in when the reactor is stopped for an outage and the assumed functional condition where no or limited examination is possible—essentially a photograph of the fastener population as is at the time of stoppage. In other words, if replacement fasteners are going to be installed at specific locations at T0, these fasteners are assumed to be functional in the geometric distribution of a given initial condition of fasteners.

A step 104 of method 100, which may be performed before, during or after step 102, includes determining a future fastener failure probability model of the geometric distribution over time. The future fastener failure probability model involves determining a relative probability of fastener failures in different locations in the analyzed structure, which in this embodiment is the core barrel assembly, as a function of time for all applicable degradation mechanisms.

In this embodiment, the future fastener failure probability model is approximated by a fastener failure rate with respect to location, i.e., a geometric fastener failure distribution, and a fastener failure rate with respect to time, for example using a Weibull distribution. The geometric fastener failure distribution and the fastener failure rate data may be stored in a data record in data structure 206. Alternative embodiments include explicit modeling of individual fastener failure probability as a function of mechanistic considerations, such as stress, temperature, dose, water chemistry, load cycles and other factors contributing to fastener degradation.

The future fastener failure probability model may take into account a bias for individual fasteners or groups of fasteners. Each fastener is given a likeliness of failure depending on its location and the loads and physical factors experienced by the fastener. The bias may either be determined empirically based on operating experience or the bias is determined by explicit models considering physical parameters that vary with time such as material, mechanical, and/or environmental factors applicable to individual fasteners or groups of fasteners. In the empirical bias, each bolt may simply have a fixed failure probability attached to it all the time. By using the model bias, some parameters might very over time, providing an even more accurate estimation by taking time into account for the failure bias.

The future fastener failure probability model may also take into account uncertainty associated with less than 100% non-destructive examination (e.g. via UT) coverage for individual fasteners or groups of fasteners. Because not all the fasteners are accessible for UT inspection, it is assumed that some fasteners are functional or the inaccessible fasteners may be simply ignored in the calculation—i.e., assume the inaccessible fasteners are failure. Visual inspection can be also used for fasteners that are uninspectable via UT.

In a first sub step of determining a geometric fastener failure distribution, the IASCC susceptibility is considered for RV internals. IASCC is a mechanism for which materials exposed to neutron irradiation become more susceptible to stress corrosion cracking (SCC) with increasing neutron dose. The first substep of step 104 may include identifying fluence values at which IASCC initiates in RV internal materials, identifying fluence values where mechanical properties of the RV internal materials saturate and identifying variables to define IASCC susceptibility stress. Some key technical bases for age-related degradation mechanisms include (1) the identification of a screening neutron fluence value for initiation of IASCC based on relatively limited data in PWR internals, (2) the indication by laboratory test data that while the mechanical properties appear to saturate at moderate levels of irradiation, susceptibility to IASCC initiation continues to increase at higher doses and (3) the indication that an IASCC susceptibility stress is defined by the irradiated yield strength (which varies by dose, temperature, and effective plastic strain) and a multiplication factor (which varies by dose).

Figure 1A:
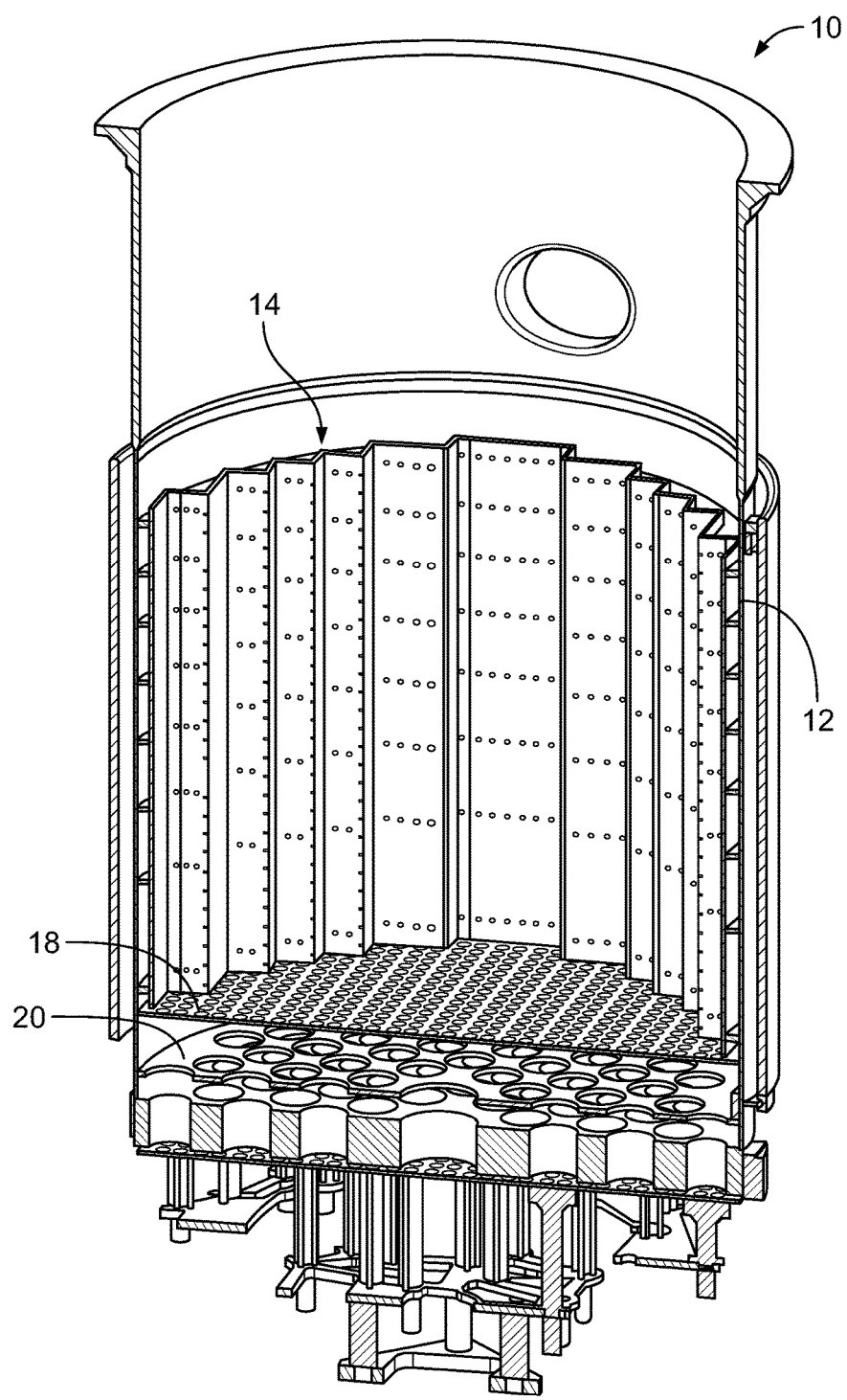
FIG. 1a shows a perspective cross-sectional view of components of an exemplary PWR.
Figure 1B:
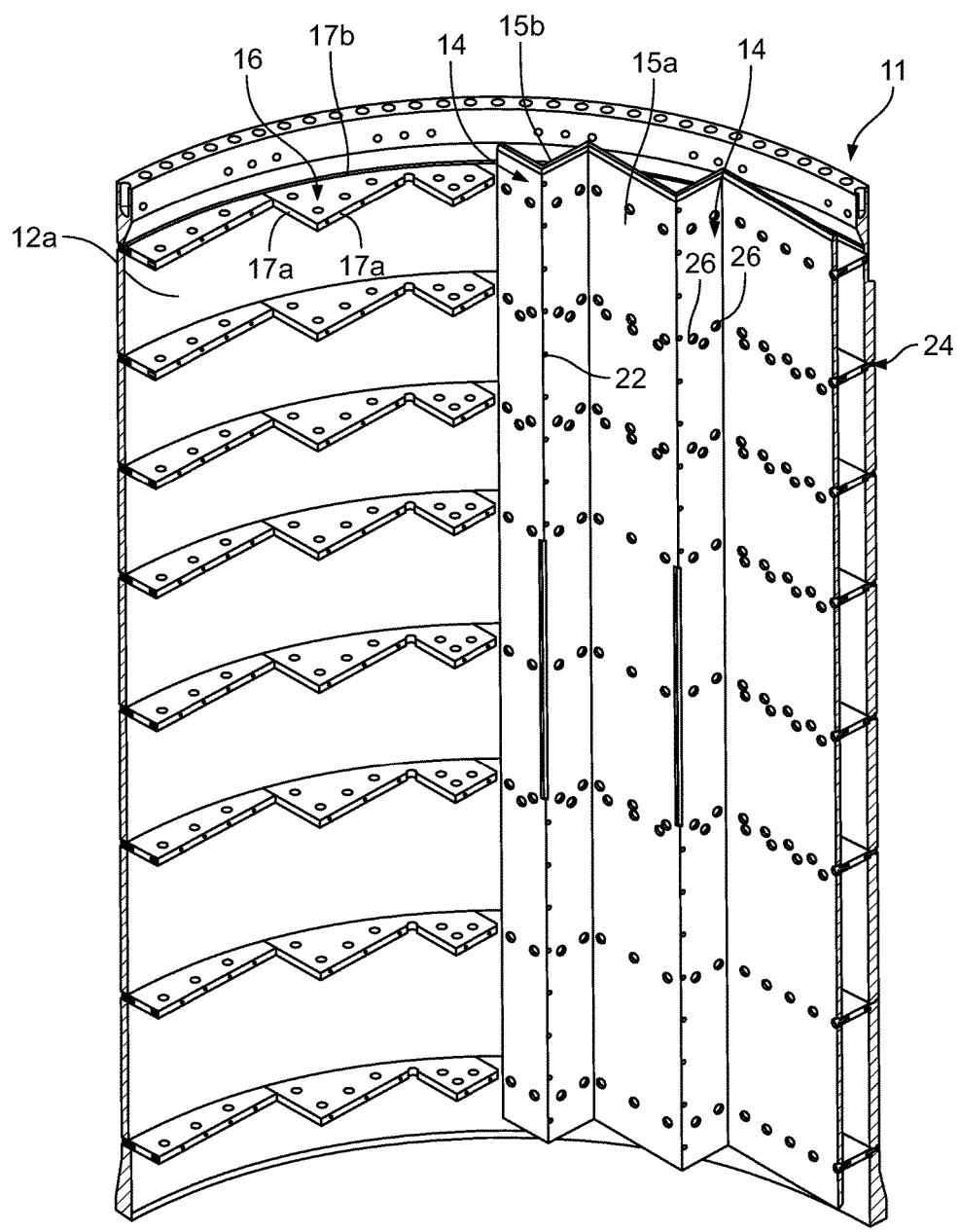
FIGS. 1b shows an enlarged view cross-sectional view of a portion of a core barrel of the PWR shown in FIG. 1a supporting baffles plates via former plates.
Figure 4:
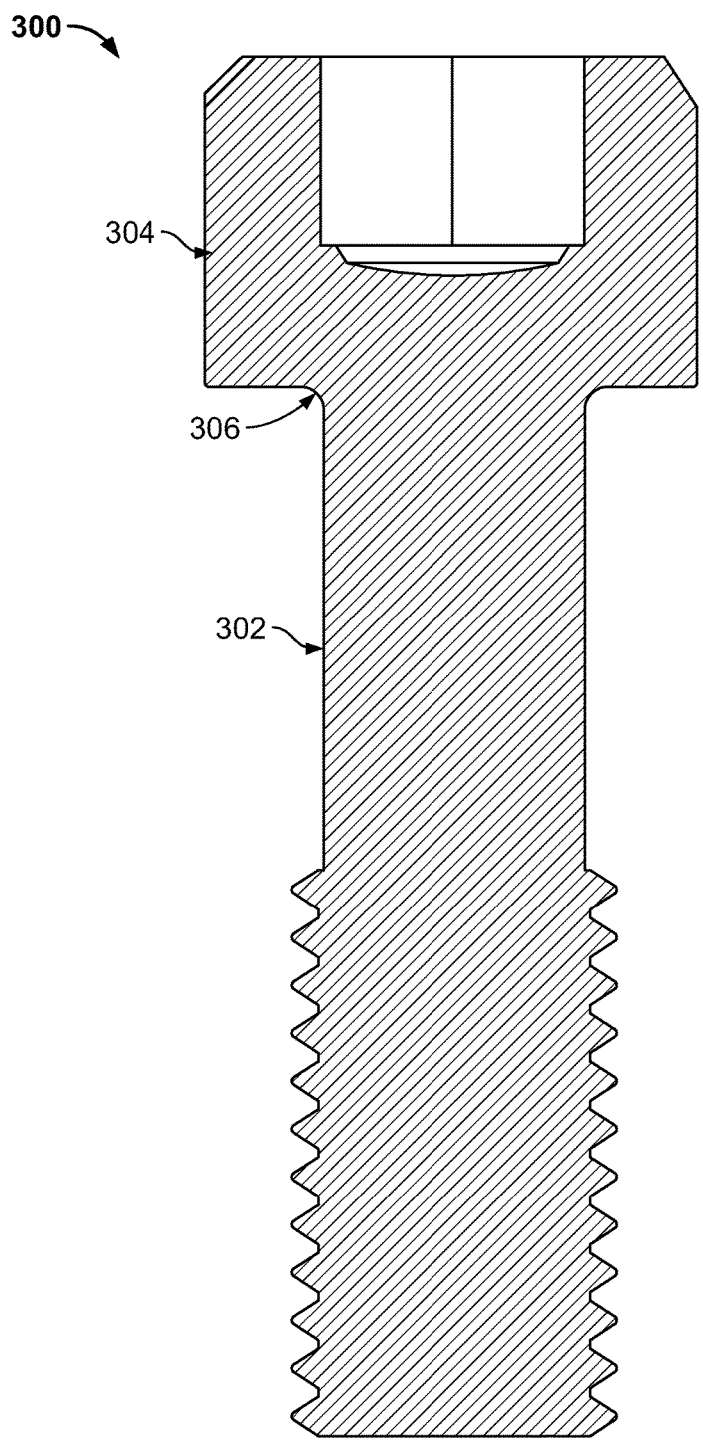
FIG. 4 shows an exemplary B-F/CB-F fastener.

Based on the technical bases considered in the first substep of determining the geometric fastener failure distribution, the IASCC susceptibility considered for RV internals is modeled in a second substep of determining the geometric fastener failure distribution for the fleet of RV internals of the specific RV internals being assessed. For the purposes of this example, generic calculations for the Babcock and Wilcox (B&W) fleet of RV internals are performed to estimate the distribution of neutron does in B-F and CB-F fasteners as a function of time. An exemplary B-F/CB-F fastener 300 is shown in FIG. 4, including a shank 302, a head 304 and a head to shank transition 306. At each time point, estimated dpa values are recorded from shank 302. The dose calculations are performed for each B-F and CB-F fastener by processor 204 and the results of the dose calculations are stored in a data record in data structure 206. Each B-F and CB-F fastener may be identified by a horizontal location identifier, which in this embodiment is a number, a vertical location identifier, which in this embodiment is a row number. For example, referring to FIGS. 1a, 1b, there are eight rows of former plates and B-F and CB-F fasteners, so the vertical location identifier may be rows one through eight.

In this embodiment, the former plates and the baffle plates may also be are divided into different groups based on plate size, a number of fasteners received by the plate, plate shape and/or vertical location or horizontal location. For example, former plates receiving a first amount of fasteners may be characterized together in the fastener failure model and former plates receiving a second amount of fasteners may be characterized together in the future fastener failure probability model. Or as another example, former plates receiving a first amount of fasteners and in a first set of rows may be characterized together in the fastener failure model, former plates receiving the first amount of fasteners and in a second set of rows may be characterized together, former plates receiving a second amount of fasteners and in the first set of rows may be characterized together in the fastener failure model and former plates receiving the second amount of fasteners and in the second set of rows may be characterized together in the future fastener failure probability model.

Generic calculations for the B&W fleet performed in "Materials Reliability Program: Aging Management Strategies for B&W Pressurized Water Reactor Internals" (MRP-231-Rev. 3). EPRI, Palo Alto, Calif.: 2014, 3002004284 compare effective stress in the B-F and CB-F bolt shank regions to the IASCC susceptibility stress. The effective stress includes the effects of normal operating loads including gamma heating, void swelling and irradiation enhanced stress relaxation. The result of the comparison is an IASCC ratio (defined as effective stress/IASCC susceptibility stress) where the greater the ratio, the greater the susceptibility to IASCC.

An IASCC ratio may be calculated and displayed for each of the B-F fasteners and for each of the CB-F fasteners over time, or the calculations may only be undertaken for a subset of the B-F fasteners and a subset of the CB-F bolts, such that the relative magnitude of the IASCC ratios may be analyzed. For example, if it is determined based on the dose calculations that a subset of B-F and/or CB-F rows are the most relevant for the future fastener failure probability model, the IASCC ratio calculations may only be undertaken for the most relevant B-F and CB-F fasteners.

In a third substep of determining the geometric fastener failure distribution, the fasteners are assigned a geometric distribution of failure based on the consideration of mechanistic relationships and operating experience. For example, each fastener may be assigned a failure percentage, and the fastener failure percentages are used to determine the cumulative failure percentage of a population of fasteners in the nuclear power plant assembly. In this embodiment, the geometric distribution of failure may be based on the determination of the first and second substeps of determining the geometric fastener failure distribution. For example, based on the results of the first and second substeps of determining the geometric fastener failure distribution, each row of CB-F or B-F fasteners may be give a assigned failure percentage, a plurality of rows of CB-F or B-F fasteners may be given the same failure percentage or a different subset of CB-F or B-F fasteners, such as a subset of identified horizontal fasteners, may be given the same failure percentage. Additionally, based on the results of the first and second substeps of determining the geometric fastener failure distribution, it may be determined that certain subsets of CB-F and B-F fasteners may be disregarded in the analysis for example if the dose or IASCC ratio is lower than a predetermined level over a period of time.

Also, because the CB-F fasteners are not inspectable, some judgment must be made about their failure probability relative to the inspectable leading component item, the B-F fasteners. Insufficient operating experience exists to reliably quantify the difference in failure probability of fasteners as a function of these parameters. Therefore, a conservative assumption is made regarding the CB-F fasteners failure probability with respect to time relative to the B-F fasteners. Failed CB-F fasteners are only expected if B-F fastener failures are observed.

Once failures of B-F fasteners are observed and additional margin is desired from this analysis, it may be possible to use the failed B-F fastener experienced feedback to quantify the failure probability as a function of dose, stress, and other parameters. This may permit a more realistic estimate of the CB-F fastener failure probability relative to the B-F fastener failure probability.

For example, if the dose at a row of B-F fasteners is less than the a predetermined threshold for IASCC initiation, and mechanical stresses on the fasteners are determined to remain in an acceptable range for a future time, the row of fasteners may be assumed to be intact, especially if B-F fasteners have not been observed in the row in other core barrel assemblies.

As another example, as mentioned above, subsets of B-F fasteners may be given a uniform geometric distribution of failures, meaning each fastener in the subset is considered equally likely to fail. The grouping of the subset may be based for example on an amount preconditioning, the amount of dose at a region of maximum stress and a temperature of the fasteners. As noted above, step 104 also includes determining a fastener failure rate with respect to time. A fastener failure rate with respect to time may be determined by establishing a probability distribution. In this embodiment, the probability distribution is a Weibull distribution. The Weibull distribution is widely applicable to modeling results of corrosion testing and the performance of equipment. The Weibull framework has been applied to numerous reliability applications, including corrosion problems and life data, due to its flexibility and utility with limited data. Statistical distributions such as the Weibull distribution have no fundamental connection to physical processes. This distribution is usually used for modeling data, and emphasis is traditionally placed on the goodness of fit rather than the physical significance.

Figure 5:
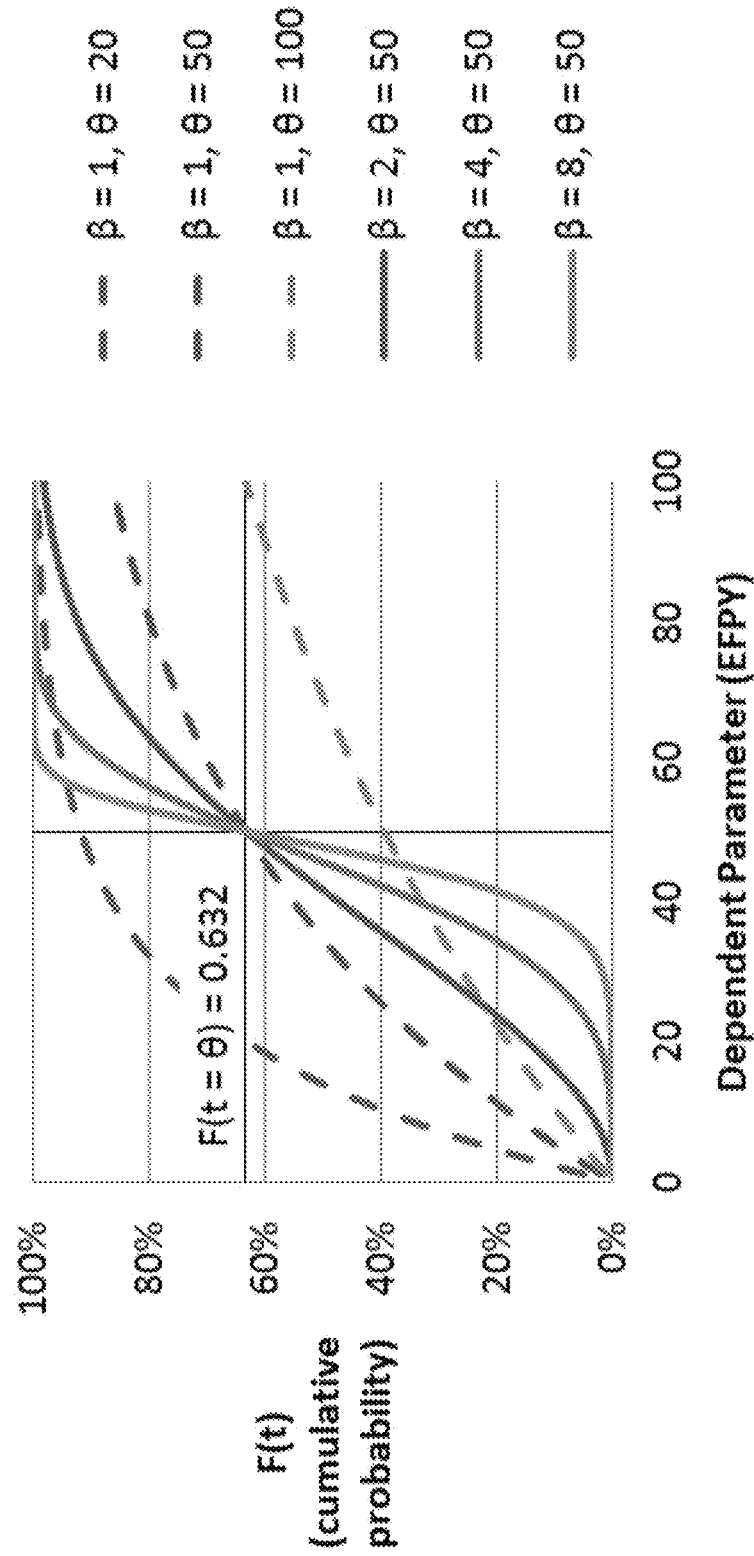
FIG. 5 shows a two-parameter Weibull cumulative distribution function plotted for various $\beta$, $\theta$ pairs.

The two-parameter Weibull cumulative distribution function (CDF) is given below in equation 1 and the CDF is plotted for various $\beta$, $\theta$ pairs in FIG. 5 as an example, plotting the cumulative probability of failure $F(t)$ as a function of time t, in the units of EFPY.

$$F(t) = 1 - \exp\left[-\left(\frac{t}{\theta}\right)^{\beta}\right] \quad (1)$$

Where: θ=the characteristic time equal to the time to a 63.2% cumulative fraction of failure; and β=slope or shape parameter.

The Weibull parameter θ is the time at which F(t)=63.2%. This can be viewed as an "average" time of failure.

In a first substep of determining the fastener failure rate with respect to time, a shape parameter β is chosen. The shape parameter, β, is a measure of the variation in failure times. As shown in FIG. 5, the greater the shape parameter, the smaller the range in failure times. For the purposes of predicting failures in the future, it is conservative to choose a high β, for example one that is higher that estimates based on the inspection of other known assemblies, which will over-predict future failures.

A next substep of determining the fastener failure rate with respect to time includes estimating upper bound values of the shape parameter β from fastener inspection results. In this embodiment, the upper bound values of the shape parameter β may be estimated from B-F bolt volumetric inspection results. The uncertainty of β may be estimated for each B-F bolt inspection dataset using one or more known statistical methods.

A conservative 7upper bound (greater than 95% probability with a 95% confidence—i.e., a 95/95 one-sided upper bound) β and a conservative (i.e., higher than expected, but not as conservative as the conservation upper bound) best estimate β were determined. A next substep of determining the fastener failure rate with respect to time includes estimating the scale parameter θ by fitting a Weibull distribution with a given β, which may be between the conservative upper bound β and the conservative best estimate β and is known to predict failure rate in RV internals, through the cumulative failure percentage of the population of fasteners in the nuclear power plant assembly determined in the third substep of determining the geometric fastener failure distribution in step 104. Alternatively, rather than being based on a fixed percentage, β may be replaced by another model taking into account parameters, such as a sophisticated model for each of the bolts or group of bolts taking into account characteristics such as the temperature fatigue, the radiation, the loads and the chemical environment.

Step 106, includes generating, by processor 204 of computer 200, a plurality of random future fastener failure patterns by applying the fastener failure model to the geometric fastener failure distribution at a given time T1>T0. This includes applying a random future fastener fail percentage to the geometric fastener failure distribution to generate the random future fastener failure patterns at the give time T1.

Next, a step 108 includes postulating fastener spacing rules designed to evaluate the acceptability of fastener failure patterns for the fasteners in the nuclear power plant assembly. The fastener spacing rules may be stored in a data record in data structure 206.

Fastener spacing rules may support varying objectives, such as demonstrating compliance with a licensing basis, such as fastened connection integrity or the ability to maintain control rod insertion, or to reduce financial risk, such as by increasing fuel reliability.

In this embodiment, step 108 includes defining a first set of fastener quantity and spacing rules for B-F fasteners and defining a second separate set of fastener quantity and spacing rules for CB-F fasteners.

Subsets of the following rules may be for example used to evaluate randomly generated future fastener failure patterns for B-F fasteners:

Plate Density: number of fasteners in each baffle plate must exceed a minimum required number of fasteners in that plate);

Proximity: functional fasteners must remain within a given proximity of required locations Row spacing: the number of empty rows in each baffle plate must not exceed a maximum number of empty rows in that plate;

Adjacent Row spacing: the number of adjacent empty rows in each baffle plate must not exceed a maximum number of consecutive empty rows in that plate;

Column spacing: the number of empty columns in each baffle plate must not exceed a maximum number of empty columns in that plate;

Adjacent Column spacing: the number of adjacent empty rows in each baffle plate must not exceed a maximum number of consecutive empty columns in that plate.

Maximum unsupported length: the maximum distance between functional fasteners on a given plate must not exceed a maximum value for that plate;

Baffle Plate constraint: In cases when one side of a baffle plate is constrained by a second baffle plate, the required number of fasteners in the vicinity of the constrained edge of the first baffle plate is reduced;

Differential Pressure: In cases where the differential pressure across a baffle plate varies as a function of elevation, the required number of fasteners is varied in conjunction with the differential pressure; and Mechanical properties: In cases where mechanical properties are not uniform (e.g., partial replacement of irradiated, high strength/low toughness fasteners with a pattern of unirradiated, low strength/high toughness fasteners), rules are modified to credit the appropriate load carrying capacity of each fastener location.

Additionally, subsets of the above rules may be applied to different subsets of B-F fasteners. The subsets may be based on plate size, a number of fasteners initially received by the plate, plate shape and/or vertical location or horizontal location. For example, if baffle plates of a first subset each initially have a first amount of fasteners and a baffle plates of a second subset initially have a second amount of fasteners different that the first amount, the acceptable numbers of total failed fasteners, consecutive failed fasteners and/or rows of failed fasteners may be different for baffles of the first and second subsets.

The same rules may also be applied to CB-F fasteners to evaluate randomly generated future fastener failure patterns for CB-F fasteners.

A postulated fastening pattern is acceptable if all criteria in the fastener spacing rules are met for each baffle-to-former plate connection and each former plate-to-core barrel cylinder connection. The fastener quantity and spacing rules are an efficient surrogate to the deterministic analysis described above. The rules permit evaluation of a large number of randomly generated fastener failure patterns in a timely manner.

In the event that additional margin is needed to justify continued operation with degraded conditions more severe than those justified in this report, less stringent rules may be postulated and tested in a validation step 110. Step 110 includes validating a conservatism of postulated fastener spacing rules relative to detailed Multiphysics analysis by a previously performed detailed Multiphysics analyses of fastener failure patterns. If the Multiphysics analyses determines the postulated simple fastener spacing rules are not sufficiently conservative, a step 111 includes iterating, by processor 204 of computer 200, steps 106, 108 to redefine the simple fastener spacing until the Multiphysics analyses determines the postulated simple fastener spacing rules are sufficiently conservative. This step 111 involves defining empirical rules definition and then iterating to seek a better result. Multiphysics analysis simulate real-world conditions by considering the impact of a number of different physics that occur concurrently, such as structural dynamics, heat transfer, fluid flow, nonlinear material behavior and motion. In this embodiment the Multiphysics analysis includes thermal hydraulic analyses, structural analyses and reactivity analyses associated with control rod insertability. The validation step 110 may require more detailed structural models and increased computer run time.

Next, a step 112 involves applying, by processor 204 of computer 200, the fastener spacing rules to the plurality of randomly generated fastener failure patterns generated in step 106 for the given time T1 to determine the probability of the randomly generated fastener failure patterns passing the fastener spacing rules. The results from steps 106 and 108 are input into a Monte Carlo simulation to determine the probability of the randomly generated fastener failure patterns passing the fastener spacing rules. Step 112 involves running the simulation based on the future fastener failure probability model and judging the results based on the fastener spacing rules. For each bolt failure time, 10,000 bolt random B-F and CB-F bolt failure patterns are generated in step 106 according the future fastener failure probability model determined in step 104. These patterns are judged against their respective rules from step 108 and the percentage of failure patterns that pass the rules are recorded in a data record in data structure 206. The highest bolt failure percentage time that yields greater than 95% probability of passing the fastener spacing rules is the maximum allowable fastener failure percentage, pending validation of the fastener spacing rules.

Figure 6:
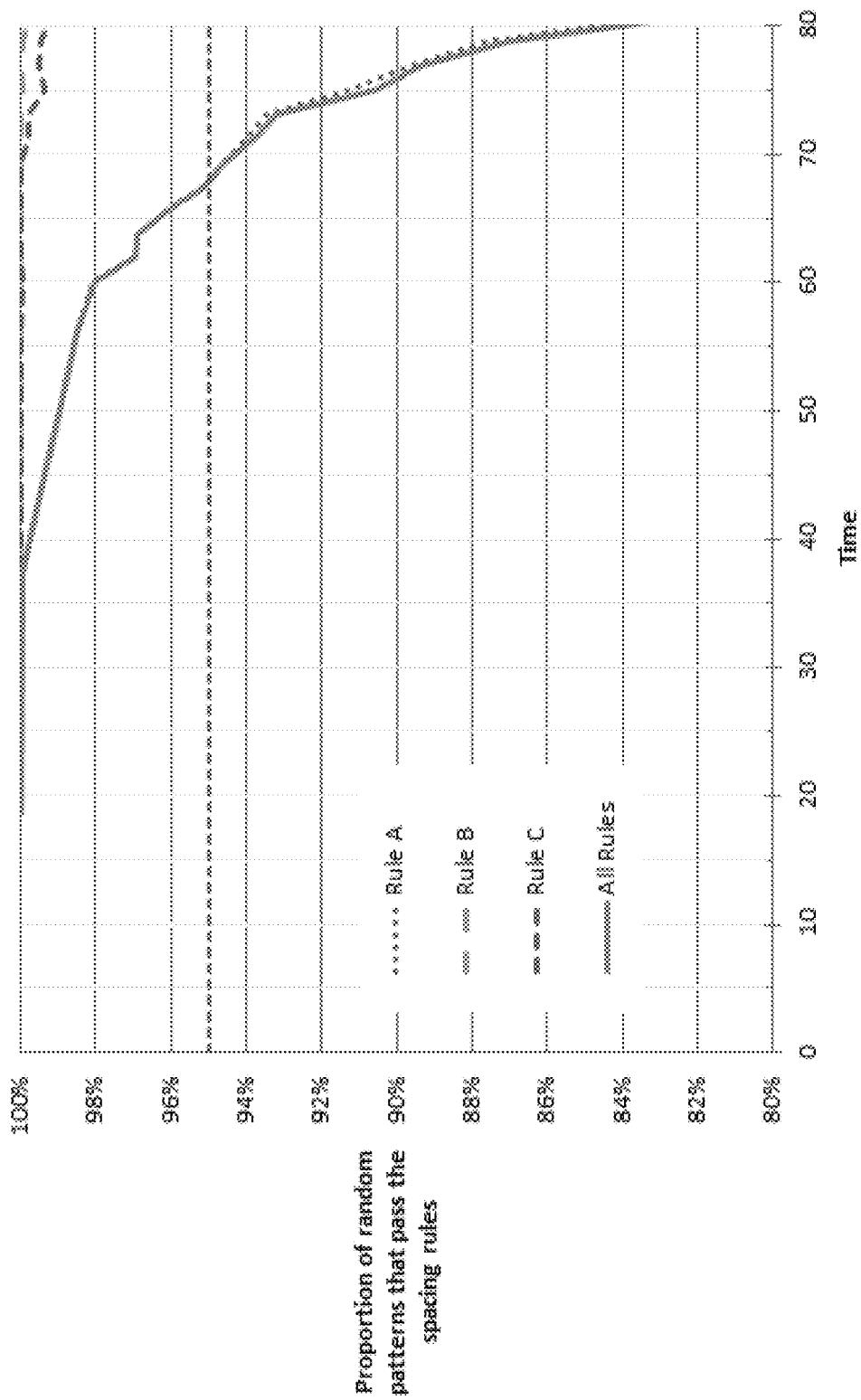
FIG. 6 shows an example of a graph illustrating a proportion of random fastener failure patterns that pass fastener spacing rules versus time.

Then, in step 114 includes iterating, by processor 204 of computer 200, steps 106, 108 and 112 for a given range of values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly. For example, if the predetermined acceptable probability of the fastener failure patterns passing the fastener spacing rules is 95%, the iterations of step 114 are continued until a sufficient number of time values are evaluated to determine a maximum future time Tmax where 95% of the random fastener failure patterns are predicted to pass the fastener spacing rules. FIG. 6 shows an example of a graph illustrating a proportion of random fastener failure patterns that pass fastener spacing rules versus time. In the example shown in FIG. 6, different lines illustrate different rules. For example, Rule A may relate to consecutive B-F bolts that may be failed, Rule B may relate to consecutive CB-F bolts that may be failed, and Rule C may relate to a total number of B-F bolts that may be failed in a baffle plate. Each rule is illustrated by a respective line in FIG. 6 indicating a portion of the random fastener failure patterns that pass the respective bolt spacing rule over time (e.g., EFPY), and a further line illustrates the a portion of the random fastener failure patterns that pass all of Rules A to C. FIG. 6 illustrates that a maximum future time Tmax in which 95% of the random patterns pass the spacing rules is approximately 67 EFPY.

After the maximum future time Tmax is calculated, a step 116 includes determining the operability interval. The operability interval is the time it takes to go from the current fastener failure percentage to the maximum allowable fastener failure percentage, based on the projected fastener failure rate with respect to time estimated by the Weibull distribution. The operability interval is calculated by subtracting the initial time T0 from the maximum future time minus the initial time T0. The replacement fasteners failure rate is considered as negligible in the operability interval Accordingly, the probabilistic analysis determination from steps 106, 112 and 114 are used to conservatively assess the likelihood of fastener failures and justify further operation.

In an alternative embodiment, the probabilistic structural analysis of method 100 may be used to determine the fastener locations and combinations where replacement fasteners would have the maximum benefit to ensuring functionality for a specified time period, such as 1 cycle, 10 years or 30 years, for the RV internals fastening. Accordingly, the method may include implementing a future failure model of the replacement fasteners to determine the probability of the randomly generated patterns passing the fastener spacing rules.

In another alternative embodiment, the probabilistic structural analysis of method 100 may be used to determine a re-examination interval for limited fastener inspection scope, based on statistical sampling techniques.

Method 100 can be applied to other nuclear power plant assemblies, including fasteners of pumps used in a nuclear power plant, lower grid assembly-to-core barrel fasteners or flow distributor-to-lower grid shell forging fasteners. Flow distributor -to-lower grid shell forging fasteners are part of the lower RV internals assembly and are used to attach the flow distributor assembly to the lower grid shell forging. The flow distributor assembly in B&W operating units is designed to be fastened to the bottom of the lower grid shell forging with ninety-six fasteners secured with locking clips. In other embodiments, the method may be applied to other fasteners in nuclear power plate assemblies, including rivets, split pins and welds.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A probabilistic method for determining an operability interval for fasteners in a nuclear power plant assembly, the operability interval indicating a time period the nuclear power plant assembly is justified for safe operation in a nuclear power plant, comprising:
   determining or assuming a geometric distribution of a given initial condition of non-inspectable fasteners in the nuclear power plant assembly at an initial time T0, the geometric distribution including a known or postulated initial pattern of the non-inspectable fasteners that are functionally fastening components of the nuclear power plant assembly together;
   determining a future fastener failure probability model of the geometric distribution over time, the future fastener failure probability model including a probability distribution of future fastener failures as a function of time for degradation mechanisms experienced by the fasteners in the nuclear power plant assembly;

generating a plurality of random future fastener failure patterns by applying the future fastener failure probability model to the geometric distribution at a given time T1>T0;

postulating fastener spacing rules designed to evaluate the acceptability of fastener failure patterns for the fasteners in the nuclear power plant assembly by taking into consideration failure location;

applying the fastener spacing rules to the plurality of randomly generated fastener failure patterns for the given time T1 to determine the probability of the randomly generated fastener failure patterns passing the fastener spacing rules at the given time T1;

iterating, by a processor of a computer, the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly, the predetermined acceptable probability ensuring a given probability of maintaining integrity of the components of the nuclear power plant assembly;

determining the operability interval as being the maximum future time Tmax minus the initial time T0, the operability interval being a time it takes to go from an initial pattern of functional fasteners to a maximum allowable fastener failure to establish a time period that the nuclear reactor is safely operable without re-examination of the fasteners during a shutdown operation.

2. The probabilistic method as recited in claim 1 wherein the geometric distribution of the fasteners includes as found conditions of existing fasteners or a combination of existing fasteners with replacement fasteners to be installed at some time T≥T0.

3. The probabilistic method as recited in claim 2 wherein the replacement fasteners failure rate is considered as negligible in the operability interval.

4. The probabilistic method as recited in claim 2 further comprising implementing a future fastener failure probability model of the replacement fasteners to determine the probability of the randomly generated patterns of the replacement fastener passing the fastener spacing rules.

5. The probabilistic method as recited in claim 1 wherein future fastener failure probability models are based on a probability distribution.

6. The probabilistic method as recited in claim 5 wherein the probability distribution for the future fastener failure probability model is based on a Weibull distribution.

7. The probabilistic method as recited in claim 1 further comprising validating conservatism of postulated simple fastener spacing rules relative to detailed Multiphysics analysis by a previously performed detailed Multiphysics analyses of fastener failure patterns, and iteratively redefining the simple fastener spacing rules if the Multiphysics analyses determines the postulated simple fastener spacing rules are not sufficiently conservative.

8. The probabilistic method as recited in claim 1 wherein the future fastener failure probability model takes into account a bias for individual fasteners or groups of fasteners.

9. The probabilistic method as recited in claim 8 wherein the bias is either determined empirically based on operating experience or the bias is determined by explicit models considering material, mechanical, and/or environmental factors applicable to individual fasteners or groups of fasteners.

10. The probabilistic method as recited in claim 1 wherein the future fastener failure probability model takes into account uncertainty associated with less than 100% non-destructive examination coverage for individual fasteners or groups of fasteners.

11. The probabilistic method as recited in claim 1 wherein the fasteners are bolts of a core barrel assembly.

12. The probabilistic method as recited in claim 11 wherein the bolts include baffle-former bolts connecting former plates to baffle plates and core barrel-former bolts connecting the former plates to a core barrel and baffle-baffle bolts connecting baffle plates to baffle plates of a core barrel assembly.

13. The probabilistic method as recited in claim 12 wherein the fastener spacing rules define maximum allowable quantities of failed bolts for the baffle plates and/or former plates.

14. The probabilistic method as recited in claim 12 wherein the fastener spacing rules define allowable spacings of failed bolts for the baffle plates and/or former plates.

15. The probabilistic method as recited in claim 1 wherein the geometric distribution includes a known or postulated initial pattern of functional fasteners fastening plates to a core barrel in a core barrel assembly of a nuclear pressure vessel, the geometric distribution being based on at least one of an inspection of the fasteners during a shutdown operation of the reactor pressure vessel and on past inspection results at one or more other nuclear power plants.

16. The probabilistic method as recited in claim 15 wherein the plates include former plate and baffle plates and the fasteners include first fasteners connecting the baffle plates to the former plate and second fasteners connecting the former plates to the core barrel, the fastener spacing rules including first rules for the first fasteners and second rules for the second fasteners that are different from the first rules, each of the randomly generated fastener failure patterns being acceptable if all criteria in the first rules and the second rules are met.

17. The probabilistic method as recited in claim 16 wherein the fastener spacing rules includes at least one of:
a number of fasteners in each plate must exceed a minimum required number of fasteners in that plate;
the functional fasteners must remain within a given proximity of required locations;
a number of empty rows in each plate must not exceed a maximum number of empty rows in that plate;
a number of adjacent empty rows in each plate must not exceed a maximum number of consecutive empty rows in that plate;
a number of empty columns in each plate must not exceed a maximum number of empty columns in that plate;
a number of adjacent empty rows in each plate must not exceed a maximum number of consecutive empty columns in that plate; and
a maximum distance between functional fasteners on a given one of the plates must not exceed a maximum value for that plate.

18. A computer program product, disposed on a non-transitory computer readable media, for probabilistically determining an operability interval for fasteners in a nuclear power plant assembly, the operability interval indicating a time period the nuclear power plant assembly is justified for safe operation in a nuclear power plant, the product including computer executable process steps operable to control a computer to:
receive inputs of a geometric distribution of a given initial condition of non-inspectable fasteners in the nuclear power plant assembly at an initial time T0, the geometric distribution including a known or postulated initial pattern of the non-inspectable fasteners that are functionally fastening components of the nuclear power plant assembly together;
receive inputs of a future fastener failure probability model of the geometric distribution over time, the future fastener failure probability model including a probability distribution of future fastener failures as a function of time for degradation mechanisms experienced by the fasteners in the nuclear power plant assembly;
generate a plurality of random future fastener failure patterns by applying the future fastener failure probability model to the geometric distribution at a given time T1>T0;
receive inputs of postulated fastener spacing rules designed to evaluate the acceptability of fastener failure patterns for the fasteners in the nuclear power plant assembly, the fastener spacing rules taking into consideration failure location;
apply the fastener spacing rules to the plurality of randomly generated fastener failure patterns for the given time T1 to determine the probability of the randomly generated fastener failure patterns passing the fastener spacing rules at the given time T1;
iterate the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly, the predetermined acceptable probability ensuring a given probability of maintaining integrity of the components of the nuclear power plant assembly;
determine the operability interval as being the maximum future time Tmax minus the initial time T0, the operability interval being a time it takes to go from an initial pattern of functional fasteners to a maximum allowable fastener failure to establish a time period that the nuclear reactor is safely operable without re-examination of the fasteners during a shutdown operation.

19. A computer configured for probabilistically determining an operability interval for fasteners in a nuclear power plant assembly, the operability interval indicating a time period the nuclear power plant assembly is justified for safe operation in a nuclear power plant, the computer comprising:
a data structure including:
an initial geometric distribution data describing a geometric distribution of a given initial condition of non-inspectable fasteners in the nuclear power plant assembly at an initial time T0, the geometric distribution including a known or postulated initial pattern of the non-inspectable fasteners that are functionally fastening components of the nuclear power plant assembly together,
a future fastener failure probability model data describing a future fastener failure probability model of the geometric distribution over time, the future fastener failure probability model including a probability distribution of future fastener failures as a function of time for degradation mechanisms experienced by the fasteners in the nuclear power plant assembly, and
fastener spacing rules data including fastener spacing rules designed to evaluate the acceptability of fastener failure patterns for the fasteners in the nuclear power plant assembly, the fastener spacing rules taking into consideration failure location; and
a processor configured to control the computer to:
generating a plurality of random future fastener failure patterns by applying the future fastener failure probability model to the geometric distribution at a given time T1>T0;
apply the fastener spacing rules to the plurality of randomly generated fastener failure patterns for the given time T1 to determine the probability of the randomly generated fastener failure patterns passing the fastener spacing rules at the given time T1;
iterate the applying step for a given range of time values T2, T3, . . . , Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly, the predetermined acceptable probability ensuring a given probability of maintaining integrity of the components of the nuclear power plant assembly;
determine the operability interval as being the maximum future time Tmax minus the initial time T0, the operability interval being a time it takes to go from an initial pattern of functional fasteners to a maximum allowable fastener failure to establish a time period that the nuclear reactor is safely operable without re-examination of the fasteners during a shutdown operation.

20. A probabilistic method for determining an operability interval for fasteners in a nuclear power plant assembly, the operability interval indicating a time period the nuclear power plant assembly is justified for safe operation in a nuclear power plant, comprising:
determining or assuming a geometric distribution of a given initial condition of fasteners in the nuclear power plant assembly at an initial time T0, the geometric distribution including a known or postulated initial pattern of functional fasteners fastening plates to a core barrel in a nuclear pressure vessel;
determining a future fastener failure probability model of the geometric distribution over time, the future fastener failure probability model including a probability distribution of future fastener failures as a function of time for degradation mechanism experienced by the fasteners in the nuclear pressure vessel, the degradation mechanisms including at least one of irradiation-assisted stress corrosion cracking (IASCC), irradiation-enhanced stress relaxation/irradiation creep (ISR/IC) and irradiation embrittlement;
generating a plurality of random future fastener failure patterns by applying the future fastener failure probability model to the geometric distribution at a given time T1>T0;
postulating fastener spacing rules designed to evaluate the acceptability of fastener failure patterns for the fasteners in the nuclear power plant assembly, the fastener spacing rules including at least one of:
a number of fasteners in each plate must exceed a minimum required number of fasteners in that plate;
the functional fasteners must remain within a given proximity of required locations;
a number of empty rows in each plate must not exceed a maximum number of empty rows in that plate;

a number of adjacent empty rows in each plate must not exceed a maximum number of consecutive empty rows in that plate;

a number of empty columns in each plate must not exceed a maximum number of empty columns in that plate;

a number of adjacent empty rows in each plate must not exceed a maximum number of consecutive empty columns in that plate; and a maximum distance between functional fasteners on a given one of the plates must not exceed a maximum value for that plate;

applying the fastener spacing rules to the plurality of randomly generated fastener failure patterns for the given time T1 to determine the probability of the randomly generated fastener failure patterns passing the fastener spacing rules at the given time T1;

iterating, by a processor of a computer, the applying step for a given range of time values T2, T3, ..., Tx>T0 and determining a maximum future time Tmax at which a predetermined acceptable probability of the fastener failure patterns passing the fastener spacing rules is met, thereby justifying the acceptability of the fasteners for continued operation of the nuclear power plant assembly, the predetermined acceptable probability ensuring a given probability of maintaining integrity of a fastened connection of the plates to the core barrel;

determining the operability interval as being the maximum future time Tmax minus the initial time T0, the operability interval being a time it takes to go from a current fastener failure percentage to a maximum allowable fastener failure percentage, based on the projected fastener failure rate with respect to time estimated by a probability distribution to establish a time period that the nuclear reactor is safely operable without re-examination of the fasteners during a shutdown operation.

* * * * *